(12) United States Patent
Fischer et al.

(10) Patent No.: US 9,908,613 B2
(45) Date of Patent: Mar. 6, 2018

(54) PROPULSION SYSTEM FOR AIRCRAFT, IN PARTICULAR LIGHTWEIGHT AIRCRAFT

(71) Applicant: INNOVATIVE DRAGON LTD., London (GB)

(72) Inventors: Herwig Fischer, London (GB); Hanno Fischer, Willich (DE)

(73) Assignee: INNOVATIVE DRAGON LTD., London (GB)

( * ) Notice: Subject to any disclaimer, the term of this patent is extended or adjusted under 35 U.S.C. 154(b) by 312 days.

(21) Appl. No.: 14/428,654

(22) PCT Filed: Sep. 9, 2013

(86) PCT No.: PCT/EP2013/068575
§ 371 (c)(1),
(2) Date: Mar. 17, 2015

(87) PCT Pub. No.: WO2014/044564
PCT Pub. Date: Mar. 27, 2014

(65) Prior Publication Data
US 2015/0210380 A1    Jul. 30, 2015

(30) Foreign Application Priority Data
Sep. 18, 2012    (DE) .......... 10 2012 018 499

(51) Int. Cl.
*B64C 11/00* (2006.01)
*B64C 1/06* (2006.01)
(Continued)

(52) U.S. Cl.
CPC ............ *B64C 11/001* (2013.01); *B64C 1/061* (2013.01); *B64C 1/065* (2013.01); *B64C 1/16* (2013.01); *B64C 1/18* (2013.01); *B64C 11/46* (2013.01); *B64C 35/00* (2013.01); *B64C 35/008* (2013.01); *B64C 39/12* (2013.01); *B64D 27/06* (2013.01); *B64D 27/08* (2013.01); *B64D 27/24* (2013.01); *B64D 27/26* (2013.01); *B64D 35/04* (2013.01)

(58) Field of Classification Search
CPC ........ B64D 27/08; B64D 27/14; B64D 27/20; B64D 29/04; B64C 11/001
See application file for complete search history.

(56) References Cited

U.S. PATENT DOCUMENTS 2,948,111 A    8/1960 Nelson
3,397,854 A *  8/1968 Reyle ..................... B64C 11/00
                                                    244/106
(Continued)

FOREIGN PATENT DOCUMENTS

DE    1 781 112 A1   10/1970
DE    199 19 626 A1  11/2000
(Continued)

*Primary Examiner* — Philip J Bonzell
*Assistant Examiner* — Michael B Kreiner
(74) *Attorney, Agent, or Firm* — McGlew and Tuttle, P.C.

(57) ABSTRACT

A propulsion system for aircraft, in particular lightweight aircraft, provides a low-noise and low-cost aircraft. The propulsion system includes at least two ducted propellers (3, 3'). The ducts of are provided laterally on the fuselage (4) of the aircraft in such a way that the common net thrust of the ducted propellers is substantially collinear to the net drag.

17 Claims, 4 Drawing Sheets

(51) Int. Cl.
  *B64C 35/00*   (2006.01)
  *B64D 27/06*   (2006.01)
  *B64D 27/08*   (2006.01)
  *B64D 35/04*   (2006.01)
  *B64C 1/16*    (2006.01)
  *B64C 1/18*    (2006.01)
  *B64C 11/46*   (2006.01)
  *B64C 39/12*   (2006.01)
  *B64D 27/26*   (2006.01)

(56) References Cited

U.S. PATENT DOCUMENTS

| | | | | |
|---|---|---|---|---|
| 4,690,353 | A * | 9/1987 | Haslim | B64D 15/163 |
| | | | | 244/134 D |
| 5,810,289 | A * | 9/1998 | Sager | B63H 1/26 |
| | | | | 244/65 |
| 8,636,241 | B2 * | 1/2014 | Lugg | B64C 29/0025 |
| | | | | 244/12.1 |
| 8,752,788 | B2 * | 6/2014 | Tuval | B64C 3/32 |
| | | | | 244/34 A |
| 8,991,741 | B2 * | 3/2015 | Wang | B64C 3/54 |
| | | | | 244/12.4 |
| 9,045,226 | B2 * | 6/2015 | Piasecki | G05D 1/102 |
| 2003/0168552 | A1 * | 9/2003 | Brown | B64C 11/46 |
| | | | | 244/55 |
| 2014/0367510 | A1 * | 12/2014 | Viala | B64D 27/24 |
| | | | | 244/62 |
| 2015/0108269 | A1 * | 4/2015 | Lugg | B64C 1/26 |
| | | | | 244/13 |

FOREIGN PATENT DOCUMENTS

| | | |
|---|---|---|
| FR | 2 155 811 A1 | 5/1973 |
| FR | 2 647 414 A1 | 11/1990 |
| GB | 518 663 A | 3/1940 |
| WO | 2009/069109 A2 | 6/2009 |

\* cited by examiner

PROPULSION SYSTEM FOR AIRCRAFT, IN PARTICULAR LIGHTWEIGHT AIRCRAFT

CROSS REFERENCE TO RELATED APPLICATIONS

This application is a United States National Phase Application of International Application PCT/EP2013/068575 filed Sep. 9, 2013 and claims the benefit of priority under 35 U.S.C. § 119 of German Patent Application DE 10 2012 018 499.9 filed Sep. 18, 2012, the entire contents of which are incorporated herein by reference.

FIELD OF THE INVENTION

The present invention relates to a propulsion system for aircraft, in particular lightweight aircraft.

BACKGROUND OF THE INVENTION

Aircraft in the smaller weight classes are generally driven by propellers that are connected to internal combustion engines. The advantage of such a propulsion system is that the good thermal efficiency of the internal combustion engine in particular results in low consumption and low emissions, including in partial load and no-load operation, and the costs of the engine itself are low. The conversion of the mechanical power into thrust by the propeller in this case is efficient, particularly in the lower speed range, so that shorter take-off distances and favorable rates of climb of the aircraft are achieved. In contrast, in particular the following disadvantages are associated with such a drive:
  The propeller has a large diameter, so that a high landing gear is necessary, which is difficult to retract and produces high drag. A high landing gear also increases the risk of overturning.
  The propeller is usually disposed forward in the fuselage of the aircraft, so that the view and the design freedom of the aircraft are still very limited, resulting in almost all models looking the same.
  Large centrifugal forces of the large propeller occur, so that there is also a reaction about the other two axes to control commands of the pilot about one of the three axes.
  The propeller slipstream has a swirl that acts on the surfaces aft of the propeller and causes a rotation of the aircraft there together with the angular momentum of the slipstream, the rotation being dependent on the selected engine power. As a result, changing the engine power also causes an unintended and unwanted change of the trim position.
  The propeller absorbs less power with increasing speed, so that either the engine power has to be throttled or a propeller adjustment is required in order to prevent overspeeding of the engine.
  The inherent efficiency of the drive is affected negatively, because the air is accelerated on the nose of the fuselage and said increased flow speed determines the air resistance on the surface of the fuselage.
  The propeller slipstream contains large turbulences that hinder the targeted laminarity of the flow over the involved areas in the slipstream.
  The propulsion system is relatively heavy in relation to the delivered power.

As an alternative to the propeller drive, jet and turbofan drives are used in more expensive aircraft, which at least partially avoid the mentioned disadvantages because the centrifugal and swirl forces are almost completely absent, the diameter of the drive being very much smaller, so that the design freedom of the design and the inherent efficiency can be significantly improved and all reactions to control or disturbance impulses act on each axis separately, being fully decoupled. The view from the cockpit is also less restricted and the height of the landing gear can be reduced. Such advantages are described as positive by the pilots of jets (positive jet characteristics).

The disadvantages of jet engines compared to propeller engines are that
  the costs of the propulsion turbine are very much higher,
  the thermal efficiency of the turbine is very much lower, especially in partial load and no-load operation,
  the thrust in the lower speed range is lower and the noise emission of the turbine is comparatively very high.

In DE 1 781 112 A it is therefore proposed that an internal combustion engine drives an encased propeller (ducted propeller or fan), so that good thermal efficiency is achieved with a thrust generator of relatively small diameter. In order to achieve good inherent efficiency and at the same time achieve the jet characteristics described, the ducted propeller is integrated within the fuselage in this case. Although the targeted advantages are achieved in this way, other significant disadvantages also occur. As a result of the integration within the fuselage, the inflow of air to the ducted propeller or fan plane is partly obstructed by elements of the structure, so that when the air enters the fan (ducted propeller) the flow speed is reduced in a few segments by so-called wake depressions in the speed profile. This phenomenon is also already known with pusher propellers. The consequence thereof is that the rotor blade encounters cyclically different incident flows during its rotation and thus the real angle of attack of the propeller blade varies and consequently the pressure on the blade also varies. Three negative effects are produced in this way:
  The forces acting on the rotor blade change suddenly, so that the blade is stimulated to vibrate and thus material fatigue effects of the structure, the rotor blades and the drive shafts occur.
  The flow conditions change from an optimal angle of attack to a degraded (possibly even detached) flow condition, so that a large additional load torque (=high engine power) is absorbed, without thereby contributing to thrust generation.
  The cyclically occurring pressure steps are emitted as acoustic oscillation that act inwards and outwards as a disturbing noise and in addition are conspicuous with uncomfortably high frequencies for typical parameters (number of blades, revolution rate, number of noise sources).

SUMMARY OF THE INVENTION

It is therefore an object of the present invention to provide a propulsion system for aircraft, in particular lightweight aircraft, which eliminates the abovementioned disadvantages.

According to the invention, a propulsion system for aircraft, in particular lightweight aircraft, is provided comprising at least two ducted propellers. The ducted propellers comprise ducts that are disposed laterally on the fuselage of the aircraft so that the common resultant thrust force $\overline{F}_S$ of the ducted propellers is essentially collinear with the resultant drag $\overline{F}_W$, whereby the thrust force advantageously acts in a torque-free manner. In other words, in a side view the thrust vector and drag vector are essentially at the same height, so that there is no pitch moment in the event of a change of thrust.

According to a first development of the invention, it is provided that the ducts of the ducted propellers are at least partly integrated within the structure of the aircraft, preferably in the region of the fuselage and/or of the wing assembly. Furthermore, an undisturbed air flow is preferably provided to the ducted propellers, so that the circulating propeller blades do not experience any changes in cyclical pressure, speed or angle of attack. Finally, a continuous joint is preferably provided between the outer duct surface and the fuselage and/or the wing assembly of the aircraft. The following advantages are achieved in this way:"

- The duct surface covered by the air flow, which generates drag in the upper speed range, is reduced.
- Induced drag is eliminated by flow around splitting channels between the fuselage/wings on the one hand and the duct profile on the other hand, in particular such channels that form the diffusors.
- The air forces acting on the duct are transferred—as axial thrust or drag depending on the flight status—without additional components with covered surfaces.

According to another embodiment, it is provided that the aircraft is implemented as a low-wing aircraft and the ducts are streamlined in the angle between the top of the wings and the fuselage. In this way the wings and/or the fuselage are at least partly in the form of a duct. Preferably, the outflow at the outlet of the fan (ducted propeller) is oriented parallel to the outflow of the air at the trailing edge of the wing (wing slipstream) when cruising, so that for said flight state the maximum inherent efficiency is achieved.

In a further, preferred implementation, the entry plane of the duct is close to the trailing edge of the wing. Therefore noise insulation by the wings is achieved below, i.e. in the primary direction of the sound emission. The flow in the critical region of the wing-fuselage transition is smoothed by the suction effect of the fan and the interference drag is reduced. An expanded version features a duct whose leading edge and/or trailing edge are configured such that none of the edges span a planar surface. In particular, wherein the leading duct edge and/or the trailing duct edge are preferably of spiral form. In other words, the edges do not extend linearly in a plane, but have a three-dimensional contour, which assists with integration within the structure of the aircraft.

A large part of the axial thrust is generated when stationary and at low speeds by the low pressure arising on the leading edge of the duct. By means of the partial integration of the ducts within the fuselage and the wings, the drag of the duct is indeed reduced, but the targeted nose thrust is thus also reduced in low speed regions, such as during the take-off run and when climbing. The nose thrust also depends on the selected duct profile, wherein a profile with greater thickness and a larger nose radius is doubly thrust-increasing, because in this case the flow tends to cause less wear, the air flow component, which does not flow in axially but radially, is thus increased and thus its mass flow rate and speed increase and furthermore the low pressure thus produced acts over a larger area i.e. higher axial forces (=pressure difference times projected area). However, in order to avoid the associated increase in the air resistance in high speed flight, in a particular implementation the duct is enclosed by an elastic element or a cushion that can be inflated from the inside and/or can be axially displaced and can be pretensioned in this way, so that it can, depending on the respective present pressure conditions, be inflated or applied completely flat and thus the respective ideal profile cross section is provided automatically or by means of the pressure or the selectable bias force.

In a further version the ducts are not integrated, but are disposed as closed rings beside the fuselage of the aircraft, wherein the drive is also performed by only one engine. In this case the boom supporting the duct is made with such a length that the ducts protrude significantly out of the region of the fuselage boundary layer and the split flow between the fuselage and the ducts does not comprise diffusor geometry but essentially constant cross sections in all flow directions.

The drive of the ducted propeller is performed—depending on aircraft type by means of an internal combustion engine or a turbine. Preferably, two ducted propellers are driven by a single engine by means of outward leading transmissions. In the case of the use of an internal combustion engine, in a preferred embodiment the cooling is further ensured by radiators disposed in the slipstream aft of the plane of the fan in the booms of the transmission, preferably in a particular arrangement between the upper and lower planes of a traction means in the form of a belt or chain. A chamber for this is integrated within the boom, the chamber accommodating the radiator and its air inlet being disposed on the leading edge towards the plane of the fan. As a result of said configuration the cooling is no longer dependent on the flying speed but on the power of the engine, so that overheating is avoided, particularly when climbing with high engine power and low flying speed.

In order to minimize the gap losses between the duct and the blade tips and yet to avoid damage to the blade or duct by contact, the inside of the duct and/or the blade tips in the plane of the fan are made of a material that is eroded without damage and/or that is elastically yielding. Furthermore, noise emissions are further reduced in a particular implementation by a design of the inner wall of the duct with bores and cavities according to the principle of Helmholtz resonators.

The blades of the rotor have a radial profile of the blade depth according to another preferred embodiment, the profile not ending in a point wherein this differs from conventional propellers—but having a constant or even increasing width in order to produce an optimized radial speed profile and in order to increase the entry speed in the annular area of the duct. An additional speed near the duct is achieved by means of a particular twist profile at larger adjustment angles at the blade tips. In a particular implementation, the blades are not disposed radially but inclined in order to further reduce step changes in the pressure profiles and hence to further reduce noise emissions.

In a further implementation, the retainer of the duct and the claddings of the transmissions are implemented as a final swirl means of the air flow similar to the guide wheels of an axial compressor.

The arrangement of the fans (ducted propellers) in the region of the transition between the wings and the fuselage causes a concentration of all forces and all masses in said region. As a result the structure of the aircraft is implemented by means of a central component (yoke), to which the engine, main undercarriage, wing assembly and fuselage are connected.

As a result of said construction the passenger cabin is moved forward, whereby boarding takes place directly into the cabin because of the low-lying landing gear (because propeller clearance is no longer necessary), without the passengers having to climb through over or under the wings. Depending on the loading there is thus a change of the position of the center of gravity. In a further implementation, a controllable canard wing is provided on the fuselage of the aircraft in addition to the tail in order to continue to achieve safe flight characteristics and an adequate torque about the lateral axis during rotation following the take-off run.

In a further embodiment of the invention, the propulsion system according to the invention is used in an amphibious vehicle or a flying boat, wherein a height adjustable and/or spring-mounted fuselage floor ensures the necessary water clearance. Advantageously, the fans are designed to be protected against water spray and are disposed above the wings. In order to have adequate water clearance, in said implementation in addition a variable height fuselage floor is provided, which can be lowered by actuators or air cushions for take-off and landing on the water. In a preferred implementation, the actuator is implemented in an elastic form in order to cushion the vertical impact during landings on water and wave formation.

In an additional version, two engines, preferably in an opposing mirrored arrangement about the longitudinal axis of the fuselage, are coupled together to drive two fans so that each engine drives both fans. In the event of the failure of one engine in said configuration the central thrust is maintained to both fans without asymmetrical thrust vectors occurring. In said implementation, in addition freewheeling is provided on both engines, so that the drag power losses of the failed engine that is not providing combustion are avoided. In this version a blade adjustment of the rotor blades is a useful addition, with which the characteristics of the fan and the engine can be adapted to the altered power curves.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
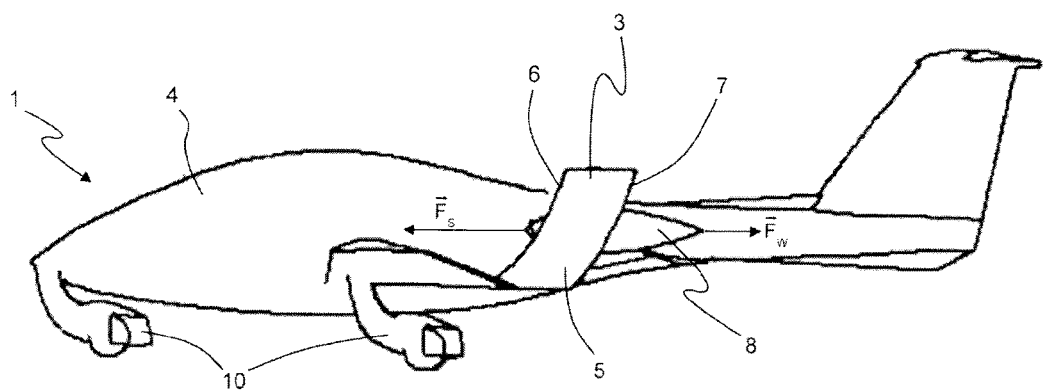
FIG. 1 is a side view of an aircraft.
Figure 2:
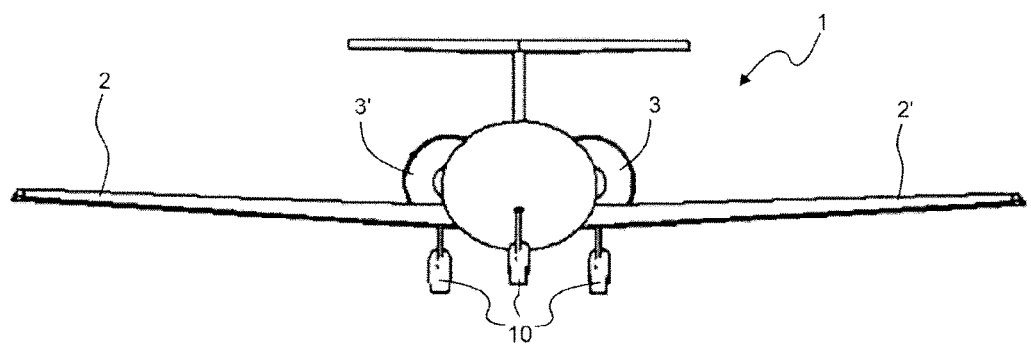
FIG. 2 is a front view of an aircraft.
Figure 3:
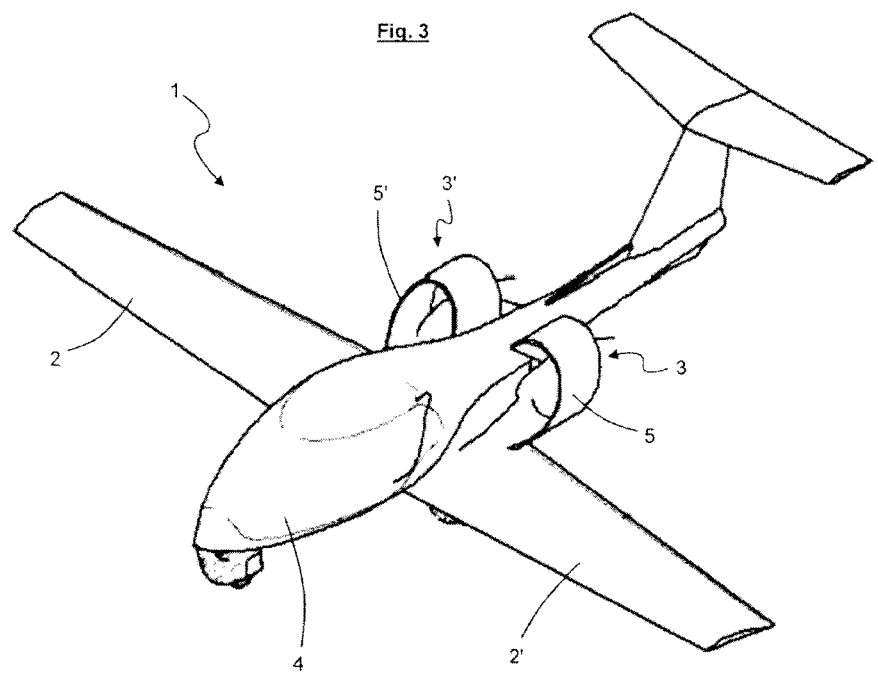
FIG. 3 is a top perspective view of an aircraft.
Figure 4:
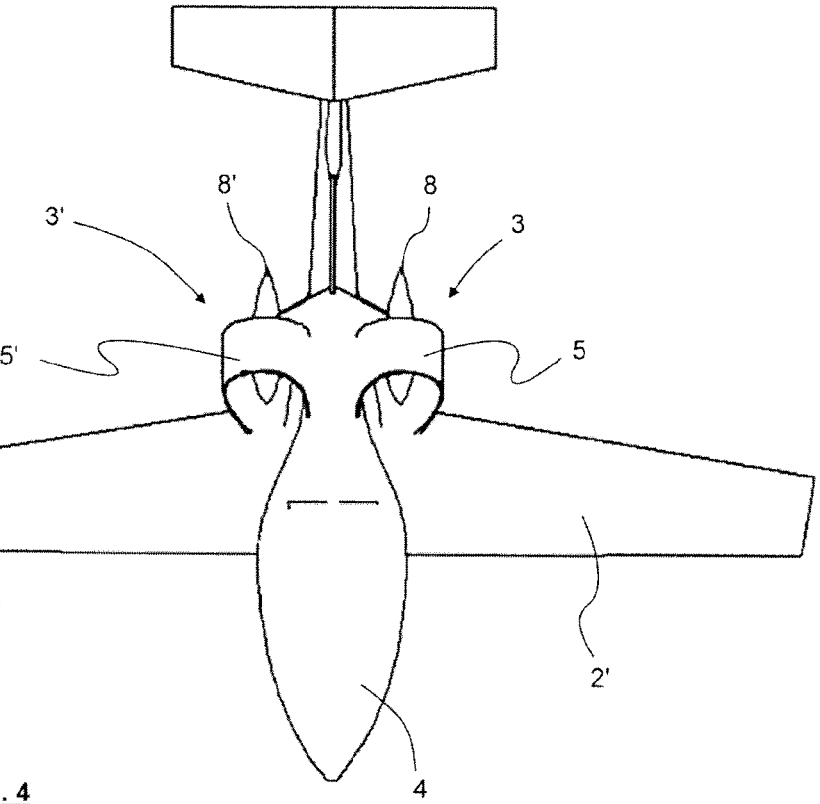
FIG. 4 is a top view of an aircraft.

A specific example of the invention is explained below using FIGS. 1 to 7, wherein FIGS. 1 to 6 show different perspectives of an aircraft. The aircraft 1 illustrated in the figures comprises two wings 2, 2' and is in the form of a low-wing aircraft with a low-lying landing gear 10. As its propulsion system the aircraft 1 comprises two ducted propellers 3, 3' that are disposed laterally on the fuselage of the aircraft 4 and on the trailing edge of the wings 2, 2'.

The ducted propellers 3, 3' each comprise a duct 5, 5' with a leading edge 6 and a trailing edge 7 as well as a hub 8, 8'. As can be clearly seen in FIG. 1, the leading and trailing edges 6, 7 are of a spiral form and do not lie in a plane. In the case of the illustrated embodiment, the ducted propellers 3, 3' are integrated within the structure of the aircraft 1. Specifically, the ducts 5, 5' are joined to the respective wings 2, 2' on the one hand and on the other hand to the fuselage 4 of the aircraft 1, so that both the wings 2, 2' and also the fuselage of the aircraft 4 form parts of the duct 5, 5'. It can further be seen in FIG. 1 that the resultant thrust force $\vec{F}_S$ is disposed essentially collinear with the resultant d $\vec{F}_W$, whereby pitching moments are prevented in the event of changes in thrust.

Figure 6:
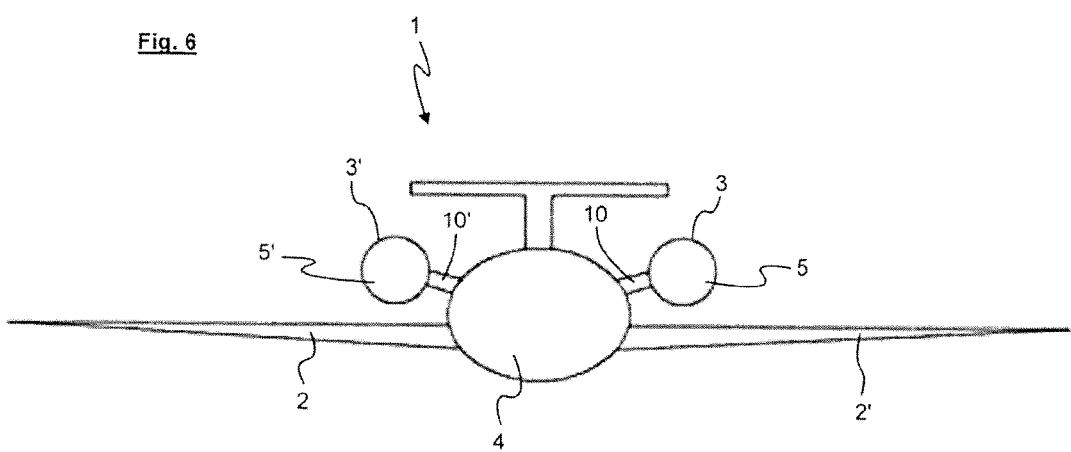
FIG. 6 is a front view of an aircraft.

In the case of the embodiment illustrated in FIG. 6, the fans (ducted propellers 3, 3') are mounted on booms 10, 10' such that the ducted propellers 3, 3' are at a distance from the fuselage 4 of the aircraft 1. In this case the magnitude of the distance is selected such that there is no diffusor between the fuselage and the duct. In this case the partial integration of the duct 5, 5' within the fuselage 4 is omitted.

Figure 7:
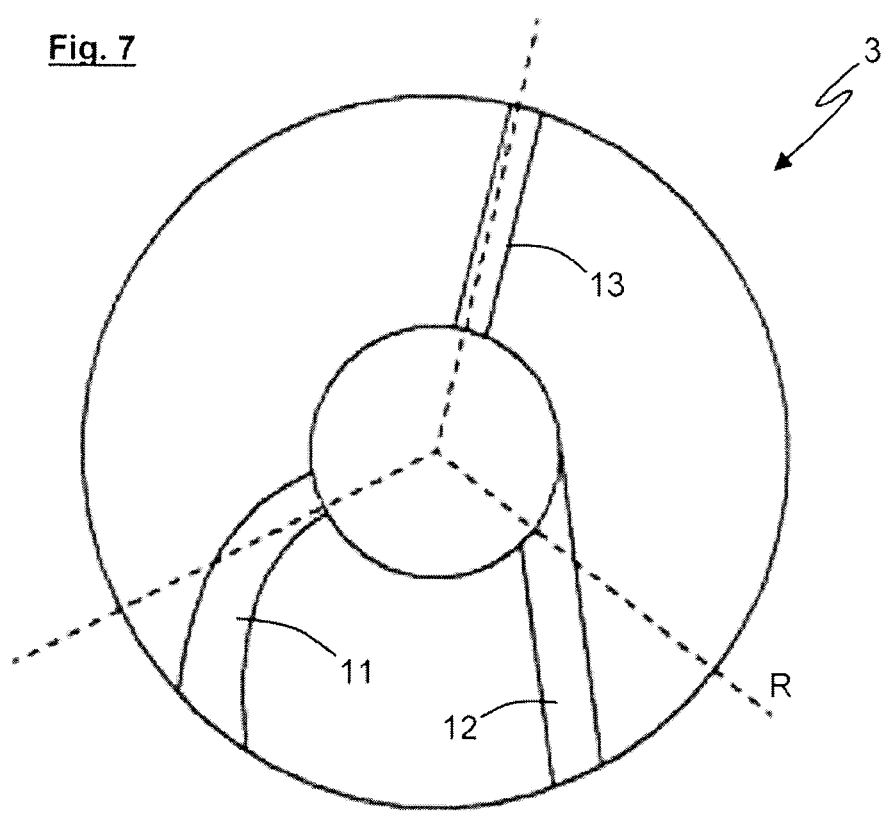
FIG. 7 is front view of a ducted propeller with differently designed rotor blades.

Finally, FIG. 7 shows the frontal view of a ducted propeller 3 with three examples of differently designed rotor blades 11, 12, 13. While the rotor blade 13 protrudes approximately radially, the rotor blade 12 is precisely oriented at an angle to the radial line R and rotor blade 11 follows a curve.

Figure 5:
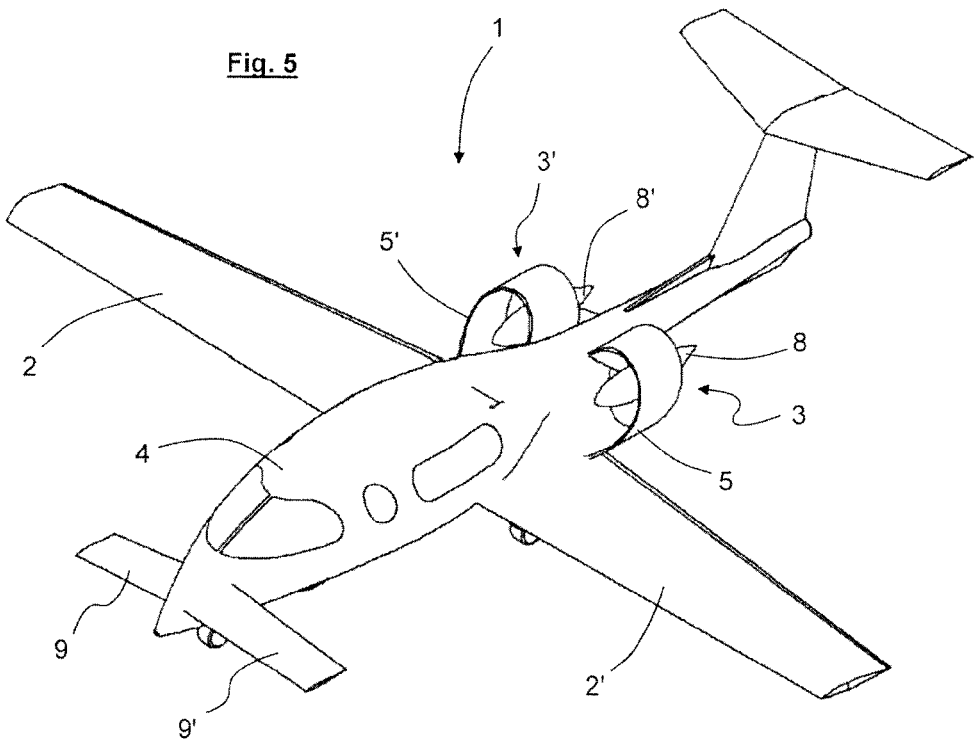
FIG. 5 is a top perspective view of an aircraft.

The aircraft 1 according to FIG. 5 shows an embodiment with canard wings 9, 9' by way of example.

While specific embodiments of the invention have been shown and described in detail to illustrate the application of the principles of the invention, it will be understood that the invention may be embodied otherwise without departing from such principles.

The invention claimed is:

1. An aircraft comprising a propulsion system, the propulsion system comprising:
   at least two propellers comprising rotor blades;
   at least two ducts cooperating with the at least two propellers to form at least two ducted propellers, the at least two ducts being disposed laterally on a fuselage of an aircraft so that a common resultant thrust force $\vec{F}_S$ of the ducted propellers is essentially collinear with a resultant drag force $\vec{F}_W$;
   wings of the aircraft protruding from an outside surface of the two ducts in a spanwise direction;
   a continuous joint between an outer duct surface and the fuselage and/or a wing assembly of the aircraft;
   wherein the aircraft is in the form of a low-wing aircraft with a wing/fuselage transition with a contour in which the ducts are integrated to some extent, whereby wings and/or the fuselage are at least partly in a duct form.

2. The propulsion system as claimed in claim 1, wherein the ducts of the ducted propellers are at least partly integrated within the structure of the aircraft, in a region of the fuselage and/or in a region of a wing assembly.

3. The propulsion system as claimed in claim 1, wherein the disposition of the ducted propellers provides an undisturbed air flow to the ducted propellers, so that the propeller blades, while circulating, do not experience any changes in cyclical pressure, speed or angle of attack.

4. The propulsion system as claimed in claim 1, wherein a propeller slipstream is essentially parallel to a wing slipstream in cruising flight.

5. The propulsion system as claimed in claim 1, wherein looking in the direction of flight, the leading duct edge is essentially disposed at a height of a trailing edge of wings.

6. The propulsion system as claimed in claim 1, wherein a leading duct edge and/or a trailing duct edge are designed such that none of the edges span a planar surface, wherein the leading duct edge and/or the trailing duct edge are of a spiral form.

7. The propulsion system as claimed in claim 1, further comprising a boom supporting each duct, wherein the boom protrudes outwards to an extent that the respective duct does not intersect or contact a fuselage surface and/or a wing surface, a spacing is provided that prevents an inflow of a boundary layer from surfaces before plane of the respective ducted propeller and a flow channel between the fuselage surface and/or the wing surface and the duct has essentially constant cross sections in a flow direction.

8. The propulsion system as claimed in claim 1, wherein far the rotor blades include blade tips which contact the duct, at least one of the blade tips and the duct being made of a material that is eroded without damage and/or that is elastic yielding.

9. The propulsion system as claimed in claim 1, wherein the rotor blades comprise variable profile lengths that are not outwardly tapered.

10. The propulsion system as claimed in claim 1, wherein angles of attack of the rotor blades increase towards an outside of the rotor blades.

11. The propulsion system as claimed in claim 1, wherein the blades do not extend directly radially and are inclined and/or curved.

12. The propulsion system as claimed in claim 1, further comprising a controllable canard wing, by means of which displacement of the center of gravity as a result of different loading is compensated.

13. A propulsion system for an aircraft with a fuselage and wings, the propulsion system comprising:
at least two propellers comprising rotor blades;
at least two ducts cooperating with the at least two propellers to form at least two ducted propellers, the at least two ducts being disposed laterally on the fuselage of the aircraft so that a common resultant thrust force $\vec{F}_S$ of the ducted propellers is essentially collinear with a resultant drag force $\vec{F}_W$, the two ducts having a leading duct edge and a trailing duct edge, in a direction of flight of the aircraft, the leading duct edge is disposed at a position of a trailing edge of the wings, the leading duct edge and the trailing duct edge being designed such that none of the edges span a planar surface, wherein the leading duct edge and the trailing duct edge are of a spiral form.

14. An aircraft system comprising:
a fuselage;
two ducts mounted on said fuselage, one said duct being mounted on one lateral side of said fuselage, an other said duct being mounted on an opposite lateral side of said fuselage, each of said ducts having an outer surface;
two wings extending radially outward from said fuselage, at least a portion of each of said two wings being separate from said two ducts, a separate one of said wings being mounted on each of said sides of said fuselage, each of said wings extending laterally outward from said fuselage further than an entirety of said outer surface of an adjacent said duct extends laterally outward from said fuselage;
two propellers comprising rotor blades, said two propellers cooperating with said two ducts to form two ducted propellers, said two ducted propellers being disposed laterally on said fuselage to form a common resultant thrust force $\vec{F}_S$ with a direction that is substantially collinear with a direction of a resultant drag force $\sqrt{F}_W$ of the aircraft.

15. A system in accordance with claim 14, wherein:
said wings are directly connected to said fuselage.

16. A system in accordance with claim 14, wherein:
an entry plane of each of said two ducts is arranged closer to a trailing edge of an adjacent said wing than to a leading edge of said adjacent wing with respect to a direction of flight of the aircraft.

17. A system in accordance with claim 14, wherein:
said two ducts have a leading duct edge and a trailing duct edge in a direction of flight of the aircraft, said leading duct edge and said trailing duct edge being designed such that none of said edges span a planar surface, wherein said leading duct edge and said trailing duct edge are of a spiral form.

* * * * *